UNITED STATES PATENT OFFICE.

GUSTAV STOLZENWALD, OF VALEA CALUGAREASCA, ROUMANIA.

PROCESS OF TREATING ZINC-RETORT RESIDUES.

No. 881,355.     Specification of Letters Patent.     Patented March 10, 1908.

Application filed September 22, 1906. Serial No. 335,826.

*To all whom it may concern:*

Be it known that I, GUSTAV STOLZENWALD, a subject of the German Emperor, of Valea Calugareasca, in Roumania, have invented an Improved Process of Treating Zinc-Retort Residues, of which the following is a specification.

The present invention has for its object a method of realizing the value of material or ore containing zinc and simultaneously profiting by the zinc and carbon constituents contained in the residue of zinc works.

The working up of the residue which accumulates when zinc is obtained in muffles or the like has up to the present not been successful in a satisfactory manner, although, on the one hand, the residue is very valuable, in that it contains quite considerable quantities of zinc which have hitherto been lost, and on the other hand it contains fuel which is not turned to account. On the contrary the removal of this residue entails considerable expense. On the other hand in manufacturing zinc-white from material containing zinc, considerable additions of fuel, as also of limestone, or the like, are required which likewise entail considerable expense for the supply of the same. Also the proposal has already been made to smelt material containing zinc and residue from zinc distillation conjointly, without, however, tangible advantages resulting, because fuel and other additions were always added to the mixture of the material to be worked up.

More particularly the present invention consists substantially in turning to account material containing zinc in combination with the residue from zinc-works, by heating both these materials mixed together in a long bedded continuous acting furnace without adding further additions of combustible or flux.

A suitable proportion of the mixture would be, for example, the following: 100 parts of material containing 10% of zinc, with 20 parts of zinc-residue containing 2% of zinc and 22% of carbon. The further treatment of the vapor containing zinc which leaves the furnace takes place in any suitable manner.

The reaction taking place in the furnace is the following: During the gradual advance of the substances into the hotter part of the furnace, there occurs a reduction of the oxid of zinc with simultaneous development of zinc fumes, which latter oxidize then again into zinc oxid, when they arrive in the rear part of the furnace.

The advantages thus obtained are not only the economies already indicated, but also substantially consist in the labor and time required for obtaining the zinc being able to be substantially reduced. While it was hitherto necessary to drive off as much zinc as possible from the raw material in extracting zinc, because the residue of zinc remaining behind was lost, and while accordingly much time and fuel had to be used for the work of reduction, now it is not a question whether somewhat more or less zinc remains over in the residue, when the residue of the zinc-works is able to be conveniently worked up according to the present invention.

What I claim as my invention and desire to secure by Letters Patent is:

A process of utilizing the waste products of zinc works consisting in mixing material containing zinc with the residue from zinc distillation works and heating said mixture in a continuous acting furnace whereby the use of coal and coke is rendered unnecessary.

In testimony whereof I have signed my name to this specification in the presence of two subscribing witnesses.

GUSTAV STOLZENWALD.

Witnesses:
    THEO. HOLLMER,
    WILHELM REUNER.